United States Patent [19]

Ells

[11] Patent Number: 4,582,091

[45] Date of Patent: Apr. 15, 1986

[54] LEAK SEALING METHOD

[75] Inventor: John W. Ells, Bexleyheath, England

[73] Assignee: The British Petroleum Company p.l.c., London, England

[21] Appl. No.: 461,580

[22] Filed: Jan. 27, 1983

[30] Foreign Application Priority Data

Feb. 2, 1982 [GB] United Kingdom ............... 8202935

[51] Int. Cl.$^4$ ............................................. F16L 55/10
[52] U.S. Cl. ....................................... 138/97; 138/98; 138/89; 166/284
[58] Field of Search ............................ 138/89, 97, 98; 166/284, 295

[56] References Cited

U.S. PATENT DOCUMENTS

| | | | |
|---|---|---|---|
| 2,193,499 | 3/1940 | Powell | 138/97 |
| 2,754,910 | 7/1956 | Derrick et al. | 166/284 |
| 2,933,136 | 4/1960 | Ayers et al. | 166/284 |
| 3,010,514 | 11/1961 | Fox | 166/284 |
| 3,028,914 | 4/1962 | Flickinger | 166/284 |
| 3,144,049 | 8/1964 | Ginsburgh | 138/97 |
| 3,227,572 | 1/1966 | Rundle et al. | 138/97 X |
| 3,367,420 | 2/1968 | Jennings et al. | 166/284 X |
| 3,472,285 | 10/1969 | Ginsburgh et al. | 138/97 |
| 3,556,831 | 1/1971 | Schenabeck et al. | 138/97 X |
| 3,613,789 | 10/1971 | Son | 166/284 X |
| 4,195,690 | 4/1980 | Erbstoesser et al. | 166/284 X |
| 4,291,069 | 9/1981 | Pilny | 138/97 X |
| 4,366,194 | 12/1982 | Pilny et al. | 138/97 X |

*Primary Examiner*—James E. Bryant, III
*Attorney, Agent, or Firm*—Morgan, Finnegan, Pine, Foley & Lee

[57] ABSTRACT

The flow of liquid escaping from a leak in a vessel, e.g., a pipeline, is reduced or eliminated by introducing particles into the liquid. The particles are dispersed in a slug of material of higherviscosity than the liquid in the vessel and the size of at least some of the particles is greater than that of the hole. The position of introduction of the slug is such that the slug containing the particles is carried by the liquid to the hole. The particles ar non-deformable so that they lodge in the hole without extruding through at elevated pressure and thereby seal the hole.

9 Claims, No Drawings

LEAK SEALING METHOD

The invention relates to a method for reducing the flow of liquid escaping from a leak in a vessel.

Although it is rare, it has been known for pipelines from other vessels to develop leaks. In a case of an undersea pipeline, amongst the most likely causes would be a ship's anchor or trawl board and in the case of a land pipeline, earth moving machinery.

Whatever the cause of the leak, it is highly desirable that the flow from the leak should be stopped or at least reduced, since in the case of a vessel containing a hydrocarbon, the economic and environmental consequences can be very serious.

It has been previously proposed in U.S. Pat. No. 3,144,049 to seal a hole in a liquid carrying pipe by introducing plugs of elastomer such as polychloroprene having a bulk density the same as the liquid in the conduit upstream of the leak so that the plugs are drawn into the hole and effect a seal.

However, this method when tried out in practice gives only limited success because the elastomer plugs, being readily deformable, tend to be extruded through the hole when the liquid in the pipe is under any significant pressure. The present invention provides an improved leak sealing method. In many cases the leak can be stopped entirely and in all cases the flow at the leak is reduced by a greater amount than achieved by the previously described method.

According to the present invention there is provided a method for reducing the flow of liquid escaping from a hole in a vessel which method comprises introducing particles into the liquid, the particles being dispersed in a slug of material of higher viscosity than the liquid in the vessel, the size of at least some of the particles being greater than that of the hole, and the position of introduction being such that the slug containing the particles is carried by the liquid to the hole, the particles being sufficiently non deformable so that they lodge in the hole without extrusion therethrough at elevated pressure and effect a reduction of the flow of escaping liquid.

By reference to the size of the particles being larger than the hole is meant that the particles will not pass through the hole. Normally this will mean that the minimum dimension of the particles is greater than the minimum dimension of the hole. However this may not always be the case since both particles and hole may be of an irregular shape.

When the liquid is a crude oil a slug of heavy fuel oil or drilling mud may be introduced with the particles. When the liquid is crude oil or water, a viscosifier of the type well known in drilling fluids such as polyacrylamide may be introduced. The material forming the slug can be chosen so that its viscosity and density and miscibility with the liquid in the pipeline are suitable for carrying the particles to the leak before the slug is dispersed in the liquid in the pipeline.

When the liquid is an oil then either simultaneously with the particles or subsequently, an oil gelling agent may then be employed. The gelling agent can be a mixture of a cross linkable polymer and a cross linking agent, supplied conveniently as two separate components, for example, as described in our copending European patent application Nos. 23084 and 62981.

Preferably particles of smaller size are introduced after the particles whose size is greater than the size of the hole. Most preferably the particles of smaller size are from ⅛ to ½ the size of the larger particles.

The particles should not be elastomeric since they will tend to be extruded through the hole by the pressure in the vessel, and can conveniently be of a non-elastomeric synthetic polymer.

Suitable such polymers are thermosetting and thermoset resins e.g. those of phenol formaldehyde, urea formaldehyde, unsaturated polyesters and epoxy resins.

The particles can be of a synthetic or naturally occurring wax. Waxes that can be employed are polyethylene and polypropylene waxes and naturally occurring plant-derived waxes such as montan wax. Other waxes that can be employed are copolymers of, for example, ethylene and vinyl acetate.

Other addition polymers may be used, for example, polymers of methyl pentenes. Other particles which can be used are those of coal tar. Preferred thermoset resins are epoxy resins.

The method of the present invention can be used at a wide range of pressures, for example up to 70 bar and epoxy resin particles are effective up to 100 bar.

The invention is illustrated by the following example:

EXAMPLE

A test rig was employed having a section of clear plastic tubing 75 mm i.d. through which a light lubricating oil was circulated. A diamond shaped aperture 50 mm long × 12.5 mm wide was cut in the top of this to simulate a leak.

Sealing particles were prepared as follows.

An epoxy resin was supplied as a two part pack and to one part was added a light weight filler consisting of hollow glass spheres. The two parts of the pack were then mixed and allowed to cure to form a block of epoxy resin incorporating the filler. The block was broken up mechanically to yield primary particles and by pestle and mortar to yield secondary particles. The primary particles were in the form of tetrahedra ranging in size from 15 mm–7 mm approximately and the secondary particles in the form of crumbs from 7 mm to 1.5 mm and powder.

Mixes A and B of greater viscosity than the oil were prepared according to the following formulations expressed as percentages by weight.

|  | Mix A | Mix B |
| --- | --- | --- |
| Water | 61.4 | 72.5 |
| Oil | 17.5 | 14.3 |
| Carbopol 910 | 2.5 | 2.0 |
| Carbopol 940 | 0.7 | 0.5 |
| 10% NaOH solution | 13.0 | 10.7 |
| Bentonite | 4.9 | — |
|  | 100.0 | 100.0 |

The Carbopols are trade names for polyacrylamides sold by B. F. Goodrich.

A two part slug was prepared by adding approximately 10–12 primary particles to 600 ml of Mix A and 50 ml secondary particles to 1.5 l Mix B.

The slug was then injected into the oil line with the primary particles at the front end and flowed through the line until the aperture was reached. The slug initially sealed the aperture but Mix A broke through leaving the primary particles jammed in the aperture with smaller gaps between them. These gaps were subsequently sealed by the smaller particles in Mix B.

A rapid increase in pressure to 5 bar was observed and the plug was firm and stable at this pressure.

I claim:

1. A method for reducing the flow of an oil escaping from a hole in a pipeline which method comprises introducing particles into the oil, the particles being dispersed in a slug of material of higher viscosity than the oil in the pipeline said slug being selected from the group consisting of a heavy oil or drilling mud, the size of at least some of the particles being greater than that of the hole and the position of introduction being such that the slug containing the particles is carried by the oil to the hole, the particles being sufficiently non-deformable so that they lodge in the hole without extrusion therethrough at elevated pressure and effect a reduction of the flow of escaping oil.

2. A method according to claim 1 wherein the oil escaping is crude oil and the slug is a heavy fuel oil.

3. A method according to claim 1 wherein the slug incorporates a viscosifier.

4. A method according to claim 3 wherein the viscosifier is a polyacrylamide.

5. A method according to claim 1 wherein the particles are selected from thermosetting resins, and non elastomeric addition polymers.

6. A method according to claim 1 wherein the particles are selected from a synthetic wax or a naturally occurring wax.

7. A method according to claim 5 wherein the particles are selected from epoxy resins.

8. A method according to claim 1 wherein particles of a smaller size are introduced after the particles whose size is larger than the hole.

9. A method as claimed in claim 8 wherein the smaller particles are from $\frac{1}{8}$ to $\frac{1}{2}$ the size of the larger particles.

* * * * *